(12) United States Patent
Samuelson et al.

(10) Patent No.: US 6,186,584 B1
(45) Date of Patent: Feb. 13, 2001

(54) SUNROOF CANOPY FOR A GOLF CAR

(75) Inventors: Donald G. Samuelson, Augusta; James M. Fulford; Terry L. Canaday, both of Evans; James K. Caldwell, Martinez; Christian J. Eck, III, Evans; Mark Wisner, Grovetown, all of GA (US)

(73) Assignee: Club Car, Inc., Augusta, GA (US)

( * ) Notice: Under 35 U.S.C. 154(b), the term of this patent shall be extended for 0 days.

(21) Appl. No.: 09/439,149

(22) Filed: Nov. 12, 1999

(51) Int. Cl.[7] .......................................................... B60J 7/02
(52) U.S. Cl. .................... 296/213; 180/89.1; 280/DIG. 1
(58) Field of Search ..................... 180/89.1; 280/DIG. 5; 296/213

(56) References Cited

U.S. PATENT DOCUMENTS

| | | | |
|---|---|---|---|
| 4,332,415 | * | 6/1982 | Williams .............................. 296/213 |
| 4,650,238 | * | 3/1987 | Healey ............................. 280/DIG. 5 |
| 5,031,713 | * | 7/1991 | Criscuolo ........................ 280/DIG. 5 |
| 5,094,500 | * | 3/1992 | Maypole et al. ................. 280/DIG. 5 |
| 5,190,340 | * | 3/1993 | Nuscher .......................... 280/DIG. 5 |

* cited by examiner

*Primary Examiner*—Kenneth R. Rice
(74) *Attorney, Agent, or Firm*—Mark A. Ussai (57) ABSTRACT

A motorized golf car includes a sing-sheet thermoplastic sunroof having a plurality of hollow stiffener channels formed therein to stiffen the canopy. A first, hollow stiffener channel is formed at the perimeter of the canopy edges, along the front and side perimeters. A plurality of second stiffener channels are formed in the sheet in-board of the first stiffener channel. A first drain gutter, sloped back-to-front, is provided in the canopy, and a second drain gutter, sloped front-to-back, is provided in the canopy to drain water from the top surface of the canopy.

8 Claims, 7 Drawing Sheets

SUNROOF CANOPY FOR A GOLF CAR

BACKGROUND OF THE INVENTION

This invention relates generally to motorized golf cars and particularly to sunroof canopies mounted on such golf cars.

A motorized golf car usually includes a sunroof canopy. Prior art canopies can be constructed from a single or multiple sheets of thermoplastic material, such as polyethylene or polypropylene.

When constructed from a single, thin sheet of thermoplastic material, prior art canopies lack rigidity, causing vibration and early failure. Also, they present sharp edges at the canopy perimeter against which a passenger's head might strike, causing injury.

When constructed from multiple sheets of thermoplastic material, prior art canopies can become unacceptably heavy. They may also present relatively sharp or unrounded edges at the canopy perimeter.

The foregoing illustrates limitations know to exist in prior art sunroof canopies. Thus, it is apparent that it would be advantageous to provide an alternative directed to overcoming one or more of theses limitations set forth above.

Accordingly, a suitable alternative is provided including the features more fully disclosed hereinafter.

SUMMARY OF THE INVENTION

In one aspect of the present invention this is accomplished by providing a sunroof for a golf car comprising: a thermoplastic sheet having a top surface and a bottom surface, the sheet terminating at edges forming a canopy perimeter; the canopy perimeter having a front portion, a rear portion and substantially parallel first and second side portions extending between the front and rear portions; a first stiffener means formed in the sheet at the sheet edges and extending along the front and side canopy perimeter portions, for stiffening the canopy; a plurality of second stiffener means formed in the sheet in-board of the first stiffener means, for stiffening the canopy, portions of the second stiffener means extending parallel to the front and side canopy perimeter portions; gutter drain means formed in the sheet for collecting and draining away water on the top surface; and means for mounting the canopy on a golf car chassis.

DETAILED DESCRIPTION

Figure 1:
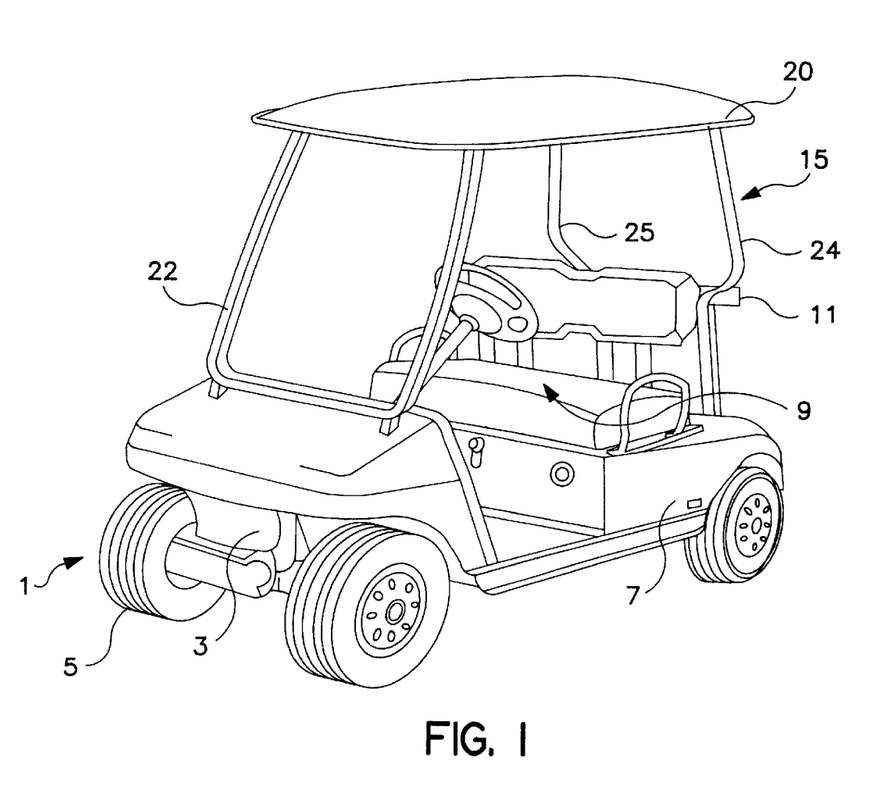
FIG. 1 is a schematic, perspective front view of a golf car incorporating features of the invention.

Referring to FIG. 1, there is shown a schematic, perspective front view of a golf car incorporating features of the invention. The golf car 1 generally comprises a chassis body 3, wheels 5, a motor 7 for driving wheels 5, a passenger sitting area 9, a golf bag storage area 11, a utility storage area (not shown), and a sunroof canopy assembly 15. Canopy assembly 15 generally comprises a generally rectangular roof canopy 20, a front support frame 22, and a pair of rear support frames 24, 25.

Figure 2:
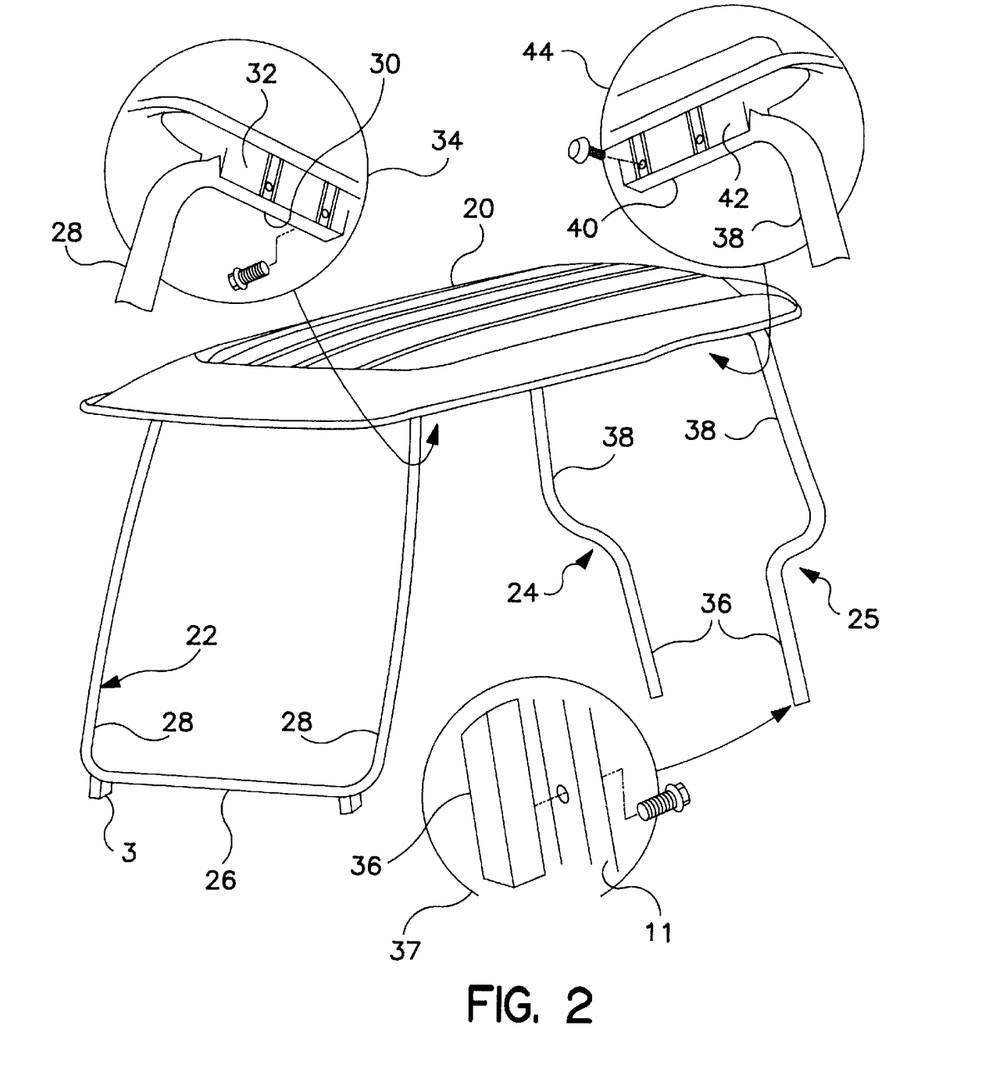
FIG. 2 is a schematic, perspective front view of a sunroof canopy, with mounting frames and braces, and exploded, magnified portions illustrating mounting of the canopy to a golf car.

As shown in FIG. 2, front support frame 22 is comprised of a generally U-shaped tubular member having a bottom section 26, two upwardly extending legs 28, with each leg terminating in a rearwardly extending portion 30. Each portion 30 extends into a slotted front side member 32 formed into the underside of canopy 20 adjacent to the side edge. As illustrated in circled portion 34 of FIG. 2, Portion 30 is bolted to slotted member 32. Bottom section 26 is bolted to chassis 3.

Rear support frames 24, 25 each include a bottom portion 36 bolted to chassis 3 at bag storage area 11 as illustrated in circled portion 37 of FIG. 37, upwardly extending portion 38, each of which terminates in a forwardly extending portion 40. Each portion 40 extends into a slotted rear side member 42 formed into the underside of canopy 20 adjacent to the side edge. As illustrated in circled portion 44 of FIG. 2, portion 40 is bolted to slotted member 42.

Figure 3:
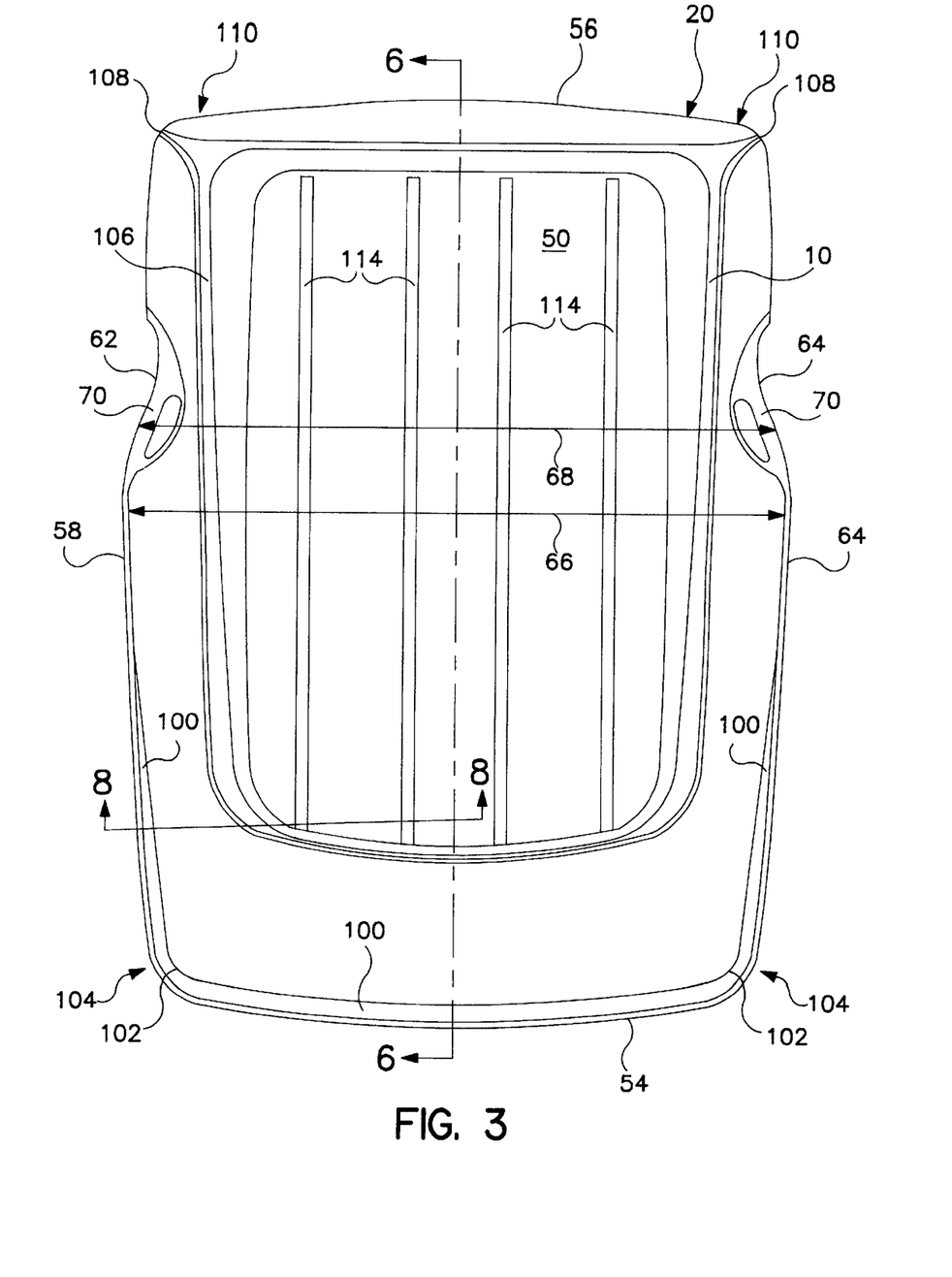
FIG. 3 is a schematic, plan top view of the sunroof shown in FIG. 1, illustrating front and side drain gutters and handgrips.

FIG. 3 shows a schematic plan view of the top surface of the canopy 20. Canopy 20 is formed into a single sheet of thermoplastic material (preferably polypropylene) using conventional gas assisted injection molding procedures. Canopy 20 has a top surface 50, a bottom surface 52 and edges that form a canopy perimeter, including a front canopy perimeter portion 54, a rear canopy perimeter portion 56, and substantially parallel first and second side canopy perimeter portions 58, 60 extending between front and rear perimeter portions 54, 56, respectively.

A first handgrip 62 is formed integrally on first canopy side perimeter portion 58. A second handgrip 64 is formed integrally on second canopy side perimeter portion 60. Handgrips 62, 64 are located at a rearward position of canopy 20 approximately an equal distance from rear canopy perimeter portion 56. The transverse width 66 of front portion of canopy 20 is wider than the transverse width 68 of rear portion of canopy 20, to shield hands holding gripping members 70 of handgrips 62, 64, as car 1 moves forward.

Figure 4:
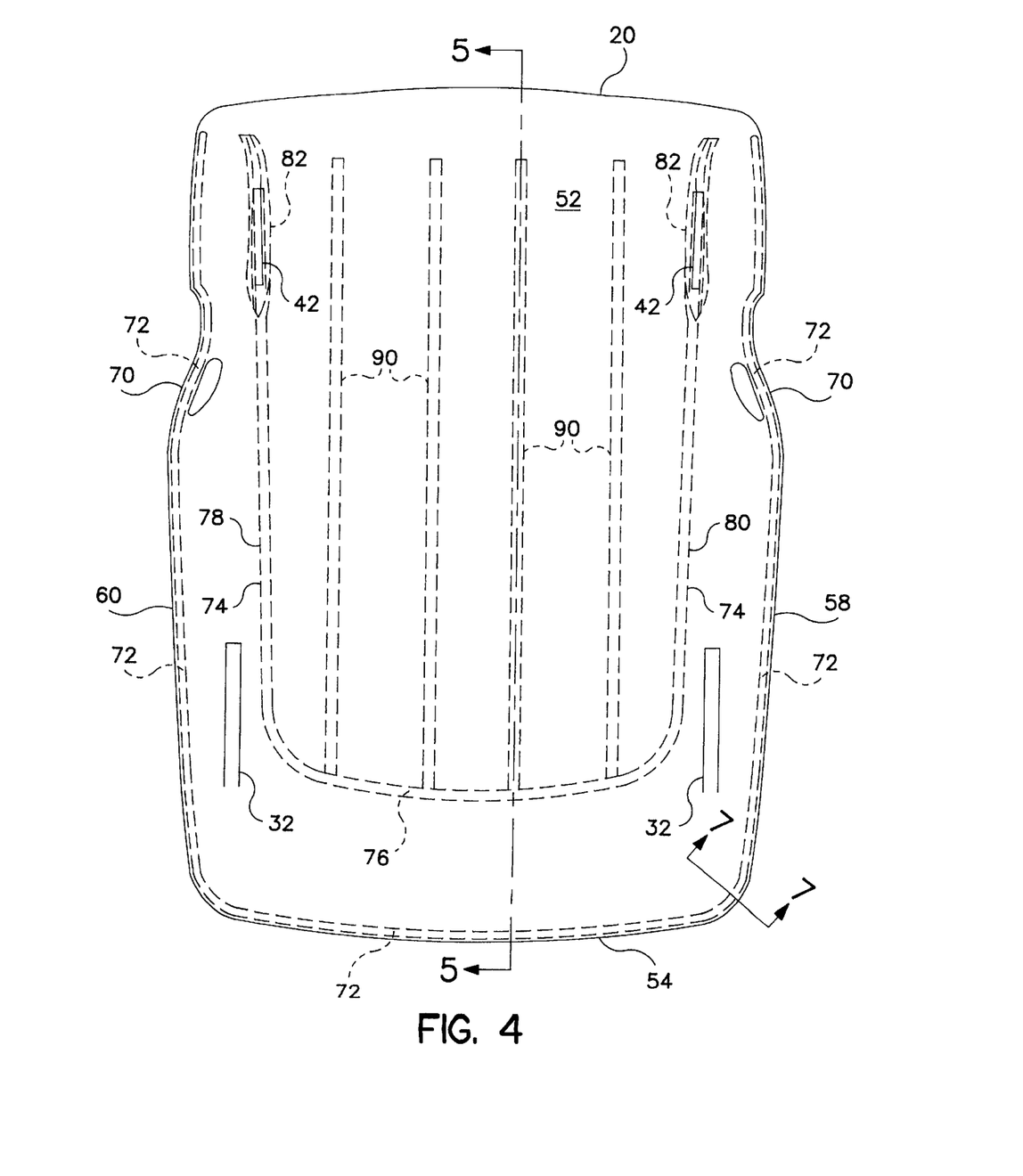
FIG. 4 is a schematic, plan bottom view of the sunroof shown in FIG. 3, illustrating the position and orientation of internal, hollow, stiffener channels in dotted lines.

FIG. 4 shows a schematic plan view of the bottom surface 52 of canopy 20. The position and orientation of various hollow channel stiffeners of this invention are shown in dotted lines. First hollow stiffener channel 72, formed integrally in to the sheet of canopy 20 at the sheet edges, extends along the front canopy perimeter 54 and along side canopy perimeters 58,60, through gripping member 70 of handgrips 62, 64, terminating adjacent rear canopy perimeter portion 56. Channel 72 forms a gently curved perimeter 54, 58 and 60, offering protection against injury to passengers. Channel 72 is hollow as a result of the gas assisted injection mold process, and provides stiffness to the sheet of the canopy 20. Hollow channels are further shown in FIGS. 5,6,7 and 8.

Likewise providing stiffness is second, hollow channel 74 formed integrally into the sheet of canopy 20 in-board of first stiffener channel 72. Second stiffener channel 74 has a front channel portion 76 and first and second side channel portion 78, 80 extending parallel to front and side canopy perimeter portions 54, 58 and 60, respectively. Channel portions 78, 80 each terminate in a bifurcated, rearward hollow channel section 82, 84 that encloses slotted rear member 42 that is formed integrally into canopy 20. Integral slotted front members 32 are also shown. Thus, it can be understood that second stiffener 74 forms a generally U-shaped stiffener that parallels front canopy perimeter 54 and curves rearwardly to extend parallel to side canopy perimeter portions 58, 60. Hollow channels are shown in FIGS. 5, 6, 7 and 8.

Figure 5:
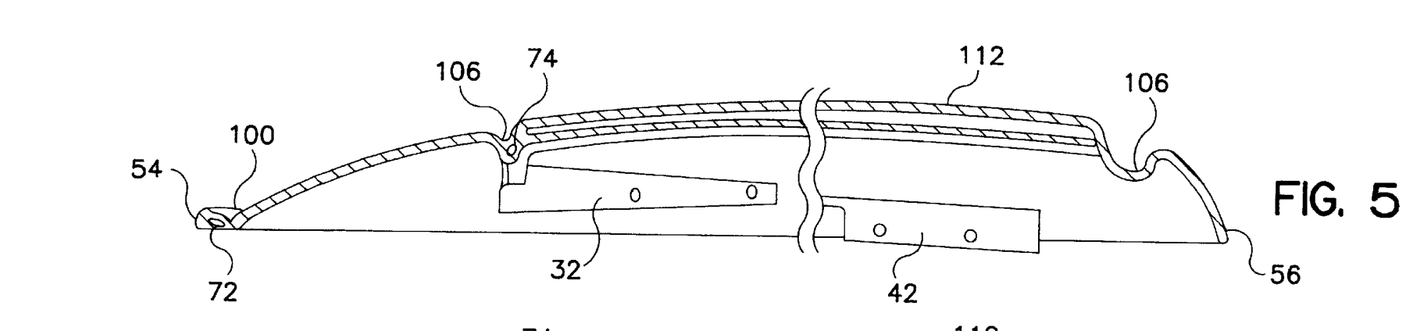
FIG. 5 is a cross-sectional view along 5—5 if FIG. 4.
Figure 6:
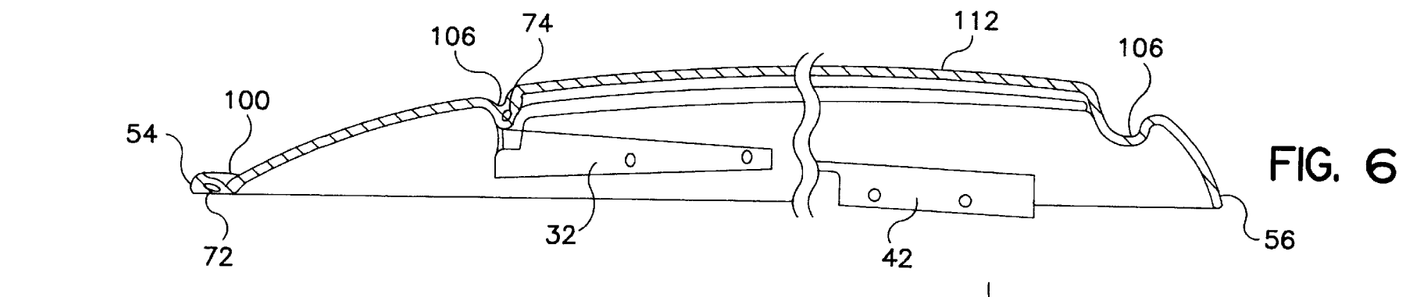
FIG. 6 is a cross-sectional view along 6—6 of FIG. 3.
Figure 7:
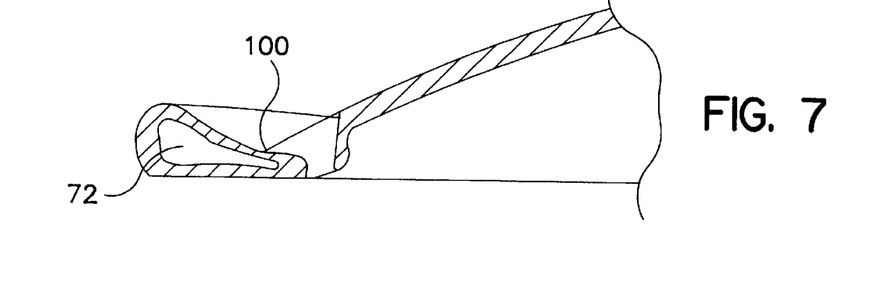
FIG. 7 is a cross-sectional view along 7—7 of FIG. 4.
Figure 8:
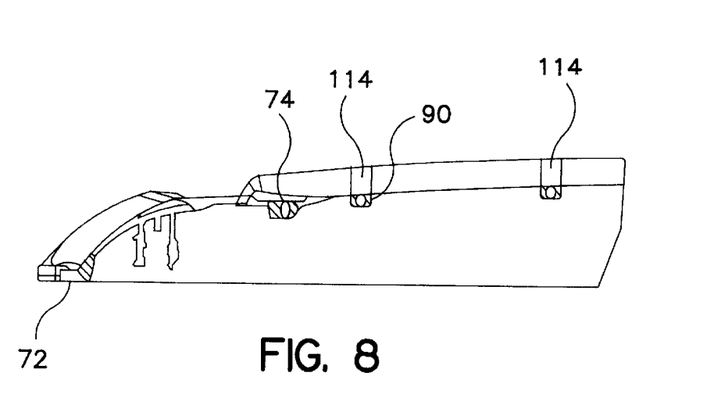
FIG. 8 is a cross-sectional view, with parts removed, along 8—8 of FIG. 3.
Figure 9:
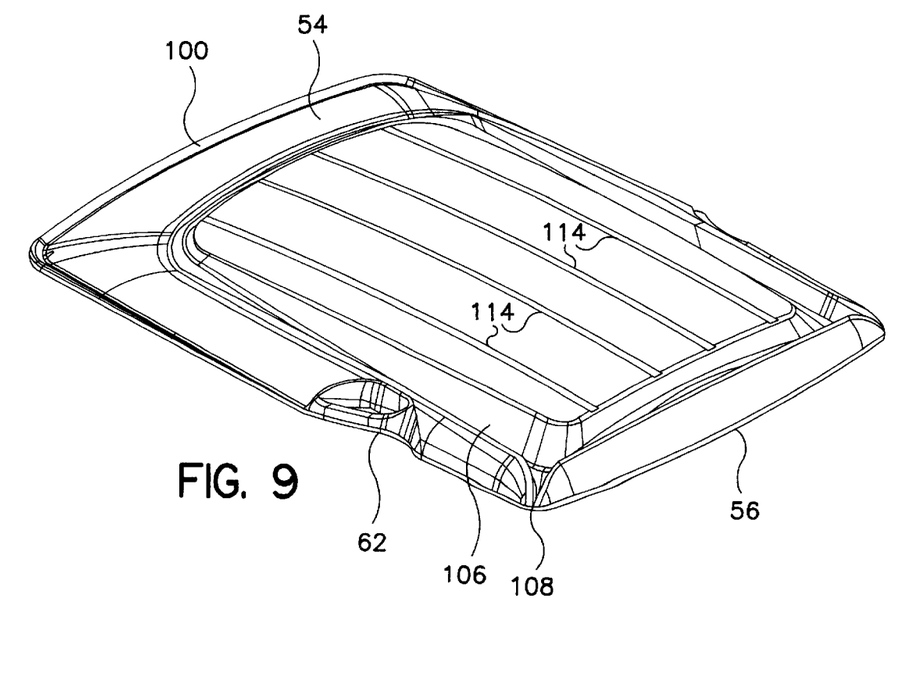
FIG. 9 is a rear perspective view of the sunroof canopy of this invention.
Figure 10:
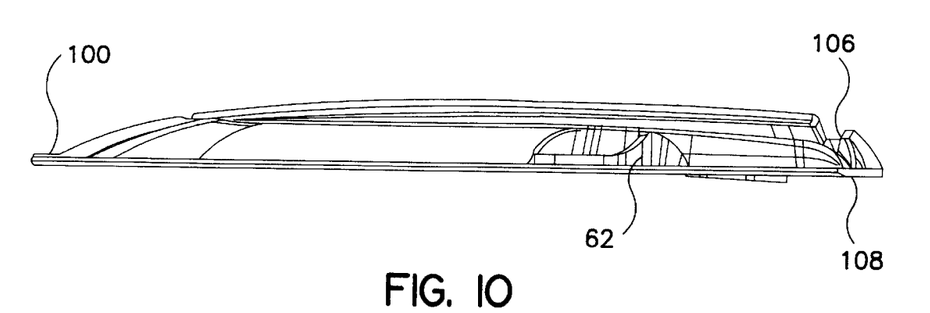
FIG. 10 is a side elevational view of FIG. 9.

Providing added stiffness is a plurality of third, hollow stiffeners 90 formed integrally into the sheet of canopy 20, in-board of second, hollow stiffeners 74. Stiffeners 90 are separate, longitudinal hollow channels extending parallel to side canopy perimeter portions 58,60. We prefer four stiffeners 90 but fewer or more will work. Stiffeners 90 intersect front channel portion 76 and terminate adjacent rear canopy perimeter portion 56. Hollow channels are shown in FIGS. 5 and 8.

FIG. 3 shows the location and orientation of drain gutters on canopy 20 . A first drain gutter depression 100 formed into the sheet of canopy 20 extends adjacent to front canopy perimeter 54 and curves rearwardly to extend along canopy perimeters 58, 60, forming a U-shaped gutter, and terminating at handgrips 62, 64. A drain hole 102 is located at each front corner 104 of gutter 100.

A second drain gutter depression 106 formed into sheet of canopy 20 extends substantially parallel to the entire perimeter of canopy 20, forming a generally rectangular shaped gutter. The sidewalls of gutter 106 part to form a drain aperture 108 at each rear corner 110.

Figure 11:
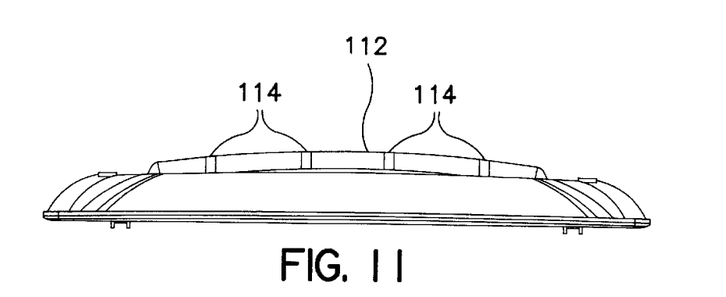
FIG. 11 is a front elevational view of FIG. 10.

As shown in FIGS. 5, 6, 9 and 10, first drain gutter 100 slopes gently forwardly, rear to front, to direct water to drain holes 102. Second drain gutter slopes gently rearwardly, front to rear, to direct water to rear corner apertures 108. As shown in FIG. 11, central canopy surface 112 slopes gently transversely, side to side to direct water to gutter 106.

We prefer to provide canopy surface with a plurality of secondary depressions 114 directly above hollow channels 90 to cosmetically mask any distortions or wrinkling associated with channels 90, although a smooth or pebbled surface will work.

We have successfully provided the canopy of this invention with a wall thickness in the range of 0.100 to 0.125 inches, from the following thermoplastic material: 20% calcium carbonate filled, high impact polypropylene copolymer.

Having described the invention, what is claimed is:

1. A sunroof for a golf car comprising:
   (a) a thermoplastic sheet having a top surface and a bottom surface, said sheet terminating at edges forming a canopy perimeter;
   (b) said canopy perimeter having a front portion, a rear portion and substantially parallel first and second side portions extending between said front and rear portions;
   (c) a first stiffener means formed in said sheet at said sheet edges and extending along said front and side canopy perimeter portions, for stiffening said canopy;
   (d) a plurality of second stiffener means formed in said sheet in-board of said first stiffener means, for stiffening said canopy, portions of said second stiffener means extending parallel to said front and side canopy perimeter portions;
   (e) gutter drain means formed in said sheet for collecting and draining away water on said top surface; and
   (f) means for mounting said canopy on a golf car chassis.

2. A sunroof for a golf car comprising:
   (a) a thermoplastic sheet having a top surface and a bottom surface, said sheet terminating at edges forming a canopy perimeter;
   (b) said canopy perimeter having a front portion, a rear portion and substantially parallel first and second side portions extending between said front and rear portions;
   (c) a first stiffener means formed in said sheet at said sheet edges and extending along said front and side canopy perimeter portions, for stiffening said canopy;
   (d) a second stiffener means formed in said sheet in-board of said first stiffener means, for stiffening said canopy, said second stiffener means extending parallel to said front and side canopy perimeter portions;
   (e) a third stiffener means formed in said sheet in-board of said second stiffener means, for stiffening said canopy, said third stiffener means extending parallel to said side canopy perimeter portions;
   (f) gutter drain means formed in said sheet for collecting and draining away water on said top surface; and
   (g) means for mounting said canopy on a golf car chassis.

3. A sunroof for a golf car comprising:
   (a) a thermoplastic sheet having a top surface and a bottom surface, said sheet terminating at edges forming a canopy perimeter;
   (b) said canopy perimeter having a front portion, a rear portion and substantially parallel first and second side portions extending between said front and rear portions;
   (c) a first, hollow stiffener channel means formed in said sheet at said sheet edges and extending along said front and side canopy perimeter portions, for stiffening said canopy;
   (d) a second, hollow stiffener channel means formed in said sheet in-board of said first stiffener channel means, for stiffening said canopy, said second stiffener channel means having a front channel portion and first and second channel portions extending parallel to said front and side canopy perimeter portions;
   (e) a third, hollow stiffener channel means formed in said sheet in-board of said second stiffener channel means, for stiffening said canopy, said third stiffener channel means comprising a plurality of longitudinal, hollow channels formed in said sheet extending parallel to said side canopy perimeter portions;
   (f) gutter drain means formed in said sheet for collecting and draining away water on said top surface; and
   (g) means for mounting said canopy on a golf car chassis.

4. The sunroof of claim 3 further comprising:
   (a) a first handgrip formed on said first canopy side perimeter;
   (b) a second handgrip formed on said second canopy side perimeter; and
   (c) said first and second handgrips being positioned at a rearward position of said canopy approximately an equal distance from said rear canopy perimeter.

5. The sunroof of claim 4 wherein said gutter means comprises:
   (a) a first drain gutter depression formed in said sheet and extending adjacent to said front canopy perimeter and curving rearwardly to extend along said side canopy perimeters to said first and second handgrips, thereby forming a U-shaped gutter;

(b) a drain hole in each front corner of said U-shaped gutter;

(c) a second drain gutter depression formed in said sheet in-board of said first gutter depression and extending parallel to said entire canopy perimeter, thereby forming a generally rectangular shaped gutter, said second drain gutter having a drain aperture formed at each rear corner thereof;

(d) said first drain gutter being gently sloped forwardly, from rear to front, to direct water to said front corner drain holes; and (c) said second drain gutter being gently sloped rearwardly, from front to rear, to direct water to said rear corner drain apertures.

6. The sunroof of claim 5 wherein said first, hollow stiffener channel extends through a gripping member formed on said first and second handgrips.

7. A motorized golf car comprising:

(a) a chassis;

(b) drive means for moving said chassis;

(c) a sunroof canopy attached to said chassis;

(d) said sunroof comprising:

1) a single sheet having a top and bottom surface, front, back, and side edges forming a canopy perimeter;

2) a first stiffener channel in said sheet at said front and side canopy perimeters;

3) a plurality of second stiffener channels in said sheet in-board of said first stiffener channel; and    4) gutter drain means in said sheet for collecting and draining away water on said top surface.

8. The sunroof of claim 6 wherein said canopy is formed from a polypropylene that is, gas assisted injection molded to final configuration.

\* \* \* \* \*